US010131738B2

(12) United States Patent
Ferencz et al.

(10) Patent No.: US 10,131,738 B2
(45) **Date of Patent: *Nov. 20, 2018**

(54) 2K POLYURETHANE SYSTEMS WITH PHASE SEPARATION

(71) Applicant: Henkel AG & Co. KGaA, Duesseldorf (DE)

(72) Inventors: Andreas Ferencz, Duesseldorf (DE); Lothar Thiele, Langenfeld (DE); Tamara Schmidt, Oberhausen (DE); Konrad Becker, Duesseldorf (DE); Wolfgang Lupp, Duisburg (DE); Dustin Ullmann, Stuttgart (DE); Oliver-Kei Okamoto, Duesseldorf (DE)

(73) Assignee: Henkel AG & Co., KGaA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,782

(22) Filed: Aug. 25, 2014

(65) Prior Publication Data

US 2014/0371391 A1 Dec. 18, 2014

Related U.S. Application Data

(63) Continuation of application No. PCT/EP2013/053699, filed on Feb. 25, 2013.

(30) Foreign Application Priority Data

Feb. 28, 2012 (EP) .................................... 12157299
Feb. 28, 2012 (EP) .................................... 12157301

(51) Int. Cl.

| | |
|---|---|
| ***B29C 45/00*** | (2006.01) |
| ***B29C 45/17*** | (2006.01) |
| ***B29C 70/48*** | (2006.01) |
| ***C08G 18/20*** | (2006.01) |
| ***C08G 18/24*** | (2006.01) |
| ***C08G 18/48*** | (2006.01) |
| ***C08G 18/76*** | (2006.01) |
| ***C08G 18/79*** | (2006.01) |
| ***C08J 5/24*** | (2006.01) |
| ***C08K 7/02*** | (2006.01) |
| *B29K 75/00* | (2006.01) |

(52) U.S. Cl.

CPC ...... *C08G 18/4829* (2013.01); *B29C 45/0001* (2013.01); *B29C 45/1701* (2013.01); *B29C 70/48* (2013.01); *C08G 18/2027* (2013.01); *C08G 18/242* (2013.01); *C08G 18/7671* (2013.01); *C08G 18/797* (2013.01); *C08J 5/24* (2013.01); *C08K 7/02* (2013.01); *B29K 2075/00* (2013.01); *C08J 2375/08* (2013.01)

(58) Field of Classification Search

CPC ....... B27N 3/10; B29C 43/00; B29C 45/0001; B29C 45/1701; B29C 70/48; B32B 27/40; C08J 2375/08; C08J 5/24; C08K 7/02; C08G 18/4829; C08G 18/2027; C08G 18/7671; C08G 18/797; C08G 18/242; C08L 75/04; B29K 2075/00

See application file for complete search history.

(56) References Cited

U.S. PATENT DOCUMENTS

| | | | | |
|---|---|---|---|---|
| 5,071,939 | A | 12/1991 | Fukami et al. | |
| 5,237,036 | A * | 8/1993 | Spitzer | 528/67 |
| 5,973,099 | A | 10/1999 | Nodelman et al. | |
| 2004/0210027 | A1* | 10/2004 | Hayashi et al. | 528/76 |
| 2006/0264534 | A1 | 11/2006 | Ma et al. | |
| 2008/0099141 | A1* | 5/2008 | Booth et al. | 156/331.7 |
| 2009/0098302 | A1 | 4/2009 | Raday | |
| 2010/0068487 | A1* | 3/2010 | Lauri et al. | 428/218 |
| 2012/0252973 | A1* | 10/2012 | Nienkemper | B29C 70/52 524/875 |
| 2013/0203935 | A1* | 8/2013 | Thiele et al. | 524/590 |
| 2014/0371391 | A1 | 12/2014 | Ferencz et al. | |

FOREIGN PATENT DOCUMENTS

| | | | |
|---|---|---|---|
| EP | 1616891 | * | 1/2006 |
| JP | S63309510 | A | 12/1988 |
| JP | 2015510011 | A | 4/2015 |
| WO | WO 2011/067246 | * | 6/2011 |

OTHER PUBLICATIONS

Machine English translation of WO 2009/150010, Krebs et al., Dec. 17, 2009.*

International Search Report issued in connection with International Patent Application No. PCT/EP2013/053699 dated May 7, 2013.

* cited by examiner

*Primary Examiner* — Patrick D Niland

(74) *Attorney, Agent, or Firm* — James E. Piotrowski

(57) ABSTRACT

The invention relates to a two-component polyurethane composition containing i) 10 to 80 wt. % of at least one polyol with an average molecular weight of 200 g/mol to 3000 g/mol, ii) 5 to 60 wt. % of at least one aromatic polyisocyanate, and iii) 0 to 15 wt. % of an additive. The composition has an NCO:OH ratio of 2:1 to 1:2, and the composition has a viscosity of 20 to 3000 mPas (EN ISO 2555, Brookfield viscometer, 25° C.) and displays a phase incompatibility after the mixing process. The functionality of the polyol mixture is greater than 2.3.

18 Claims, No Drawings

2K POLYURETHANE SYSTEMS WITH PHASE SEPARATION

The invention relates to a two-component polyurethane composition based on a polyol component and an isocyanate component, wherein it is to be introduced at a low viscosity into fiber-filled molds. The composition in liquid form exhibits a phase separation. The composition is to exhibit a high glass transition temperature in the crosslinked state.

Fiber-reinforced shaped elements are intended to have good mechanical properties. For this purpose, the matrix materials that are used must be connected in stable fashion to the fiber materials. Any defects have a negative effect on the mechanical properties of the shaped elements. As few cavities, defects, and/or bubbles as possible are therefore to be contained in the corresponding part. Suitable matrix materials based on epoxy binding agents are known. These have a variety of disadvantages, however; for example, the reactivities of the systems are often too high. That can result in a highly exothermic reaction mixture that can also impair the properties of the polymers. Other binding agents based on reactive two-component polyurethane systems have therefore also been developed.

WO 2008/110602 describes a polyurethane adhesive composition that is made of a component containing compounds having acidic hydrogen atoms, and of a polyisocyanate component together with a trimerization catalyst for the isocyanates. It is required in the claims that the two components are to be compatible with one another.

WO 2011/067246 described a resin system containing polyisocyanates, compounds having acidic hydrogen atoms reactive with respect to the polyisocyanate, a catalyst, and a higher-functional acid. The acid must be soluble in the compound having the reactive hydrogen groups.

WO 2010/023060 describes a mixture of an isocyanate-reactive compound that contains a trimerization catalyst. The latter is obtained from phthalic acid or trimellitic acid by reaction with polyols, wherein special quantitative ratios must be observed.

EP 1471088 describes polyurethane compositions that contain polyols having aromatic amine compounds. These polyols are described explicitly as compatibility-producing.

WO 2009/150010 describes a composition made of polyols having an isocyanate component, wherein the isocyanate component comprises at least 65% of the NCO groups as sterically hindered NCO groups. The composition is to be employed in fiber composite materials as a matrix resin.

The compositions recited above are often used in order to manufacture fiber-reinforced shaped parts: corresponding fiber materials are placed into closed molds and are then enveloped in the materials recited above as a matrix resin. This can be assisted by a variety of methods, for example by applying pressure, elevating the temperature, or applying vacuum. Because defects appreciably impair utilization properties, it is useful if low-viscosity materials are employed.

It has been found that the viscosity of the polyurethane systems can be set to be very low at the beginning of the reaction. The binding agents should flow around all the fiber components, since even small residual bubbles on the fibers, for example at intersection points, weaken the shaped part. But because the corresponding shaped parts can also have larger dimensions or complex shapes, it is necessary for the viscosity also remain low for a period of time sufficient to fill the mold. Only under these conditions it is possible to ensure that as few defects as possible occur in the matrix material when the intention is to achieve a high degree of fiber element filling in the component. On the other hand, the composition should crosslink as quickly as possible in order to enable rapid unmolding and better utilization of the molds.

The known compositions recited above comprise special catalysts. These are intended to ensure that a crosslinking reaction of the isocyanate/OH groups is delayed. It is thereby possible to delay the rise in the viscosity of the compositions. The final crosslinking is also slowed, however. It is moreover usual for such catalysts to be present only in small quantities. They must therefore be contained in an accurately measured proportion, since otherwise the properties are not sufficiently reproducible for industrial production.

A further requirement for the corresponding matrix binding agents is that after crosslinking, the mechanical properties remain constant even in terms of external conditions. It has been found that one influencing parameter for the mechanical properties is the glass transition temperature (Tg). This can be influenced by way of the selection of the polyols, or the crosslinking density, but the viscosity necessary for processing also must not be negatively influenced. The Tg can be influenced in particular by way of the selection of the polyols or the crosslinking density, but the viscosity necessary for processing also must not be negatively influenced.

It has been found in practice that incompatible mixtures are produced when polyols and isocyanates are mixed. This is apparent from the clouding on the inherently clear mixtures. It is known, however, that a phase separation of this kind results in inhomogeneous components. In the existing art, therefore, either special compatibility promoters are added, or a special selection of polyols must be made.

The object therefore arises of providing a polyurethane binding agent system that has a low viscosity in the uncrosslinked state and retains that low viscosity over an extended processing time period. A wide selection of polyols is to be possible. These systems can then be processed directly into matrix compositions. The crosslinked matrix is to have a high glass transition temperature and good mechanical properties.

The object is achieved by a two-component polyurethane composition containing i) 10 to 80 wt % of at least one polyol having a molecular weight from 200 g/mol to 3000 g/mol, ii) 5 to 70 wt % of at least one aromatic polyisocyanate, and optionally 0 to 15 wt % additives, wherein the composition has an NCO:OH ratio from 2:1 to 1:2, the composition has a viscosity from 20 to 3000 mPas (EN ISO 2555, Brookfield viscometer, 25° C.) and exhibits a phase incompatibility after mixing, and the functionality of the polyol mixture is greater than 2.3.

A further subject of the invention is a two-component polyurethane composition containing i) 10 to 80 wt % of at least one polyol having a number-average molecular weight from 200 g/mol to 3000 g/mol, ii) 5 to 70 wt % of at least one aromatic polyisocyanate, iii) 0 to 15 wt % additives, wherein the composition has an NCO:OH ratio from 2:1 to 1:2, the composition has a viscosity from 20 to 3000 mPas and exhibits a phase incompatibility after mixing.

A further subject of the invention is the use of such two-component polyurethane compositions to manufacture fiber-reinforced shaped parts.

A further subject is methods for manufacturing shaped parts from fiber materials and such two-component polyurethane compositions.

The two-component polyurethane composition according to the present invention is made of a polyol component and a crosslinker component. The polyol component contains at least one liquid polyol and optionally additives. The crosslinker component contains the isocyanates and optionally those additives which do not react with NCO groups.

The usual polyol compounds known to one skilled in the art can be used as a polyol component. A plurality of polyfunctional alcohols can be employed in the context of the invention. These polyols should preferably comprise no further functional groups reactive with NCO groups, for example reactive amino groups. The compounds having multiple OH groups can be those which carry terminal OH groups, or can be compounds that comprise lateral OH groups distributed over the chain. The OH groups are those which can react with isocyanates, in particular are primary or secondary OH groups. Polyols having 2 to 10, preferably having 2 to 6 OH groups per molecule, are suitable. Mixtures of different polyols can be used, provided a corresponding average functionality is maintained. The molecular weight is to be from 100 to 3000 g/mol (number-average molecular weight MN measured via GPC), preferably from 200 to 1500 g/mol. Examples of suitable polyols are those based on polyethers, polyalkylenes, polyesters, or polyurethanes. The polyols are preferably present as a mixture in liquid form at room temperature (25° C.); in particular, each polyol is individually liquid.

Suitable polyols are, for example, liquid polyester polyols that can be manufactured by condensation of di- or tricarboxylic acids, for example adipic acid, sebacic acid, and glutaric acid, with low-molecular-weight diols or triols such as ethylene glycol, propylene glycol, diethylene glycol, triethylene glycol, dipropylene glycol, 1,4-butanediol, 1,6-hexanediol, glycerol, or trimethylolpropane. A further group of such polyols to be used are polyesters based on lactones, such as polycaprolactone. Such OH-functional polyesters are known to one skilled in the art and they are commercially obtainable. Polyester polyols containing two or three terminal OH groups are particularly suitable. These polyester polyols are to have a molecular weight of up to 2000 g/mol, preferably in the range from 500 to 1000 g/mol.

Polyester polyols of oleochemical origin can also be used, however. Polyester polyols of this kind can be manufactured, for example, by complete ring opening of epoxidized triglycerides of an at least partly olefinically unsaturated fatty-acid-containing fat mixture with one or more alcohols having 1 to 12 carbon atoms, and subsequent partial transesterification of the triglyceride derivatives to yield alkyl ester polyols having 1 to 12 carbon atoms in the alkyl residue. Examples of such polyols are castor oil or dimer diols. These oleochemical polyols are to have hydroxyl numbers from 50 to 400 mg KOH/g, preferably 100 to 300 mg KOH/g, corresponding to a molecular weight from approximately 250 to 2000 g/mol.

Polycarbonate polyols are further suitable polyester polyols. Polycarbonates can be obtained, for example, by reacting diols, such as propylene glycol, butanediol-1,4 or hexanediol-1,6, diethylene glycol, triethylene glycol, or tetraethylene glycol, or mixtures of two or more thereof, with diaryl carbonates, for example diphenyl carbonate, or phosgene. A further group of polyols to be employed according to the present invention are polylactones, for example polyesters based on ε-caprolactone. Those polyester polyols which contain one or more urethane groups in the molecular chain are also suitable.

Aliphatic polyols can also be used. These are to have a functionality from 2 to 10, in particular from 2 to 6. These can be known polyols such as ethylene glycol, propanediol, butanediol-1,4, pentanediol-1,5, hexanediol-1,6, heptanediol-1,7, octanediol-1,8, 1,10-decanediol, 1,12-dodecanediol, dimer fatty alcohol, glycerol, hexanetriol, glycerol, trimethylolpropane, pentaerythritol, or neopentyl alcohol. So-called sugar alcohols can also be used. Suitable aliphatic alcohols possess a molecular weight from 60 to 400 g/mol. Linear alcohols having 2 to 30 carbon atoms which comprise two to four OH groups are, however, used in particular.

Polyether polyols that are reaction products of low-molecular-weight polyfunctional alcohols with alkylene oxides are a particularly suitable group. The alkylene oxides preferably have 2 to 4 carbon atoms. These can be difunctional or higher-functional polyols; polyols having 2, 3, or 4 OH groups are preferred. Examples are ethylene glycol, propanediol, butanediol, hexanediol, octanediol; polyfunctional alcohols such as glycerol, hexanetriol, trimethylolpropane, pentaerythritol, neopentyl alcohol; sugar alcohols such as mannitol, sorbitol, methyl glycosides. Corresponding aromatic polyols such as resorcinol, hydroquinone, 1,2,2- or 1,1,2-tris(hydroxyphenyl)ethane can also be reacted with the alkylene oxides. Further polyols suitable in the context of the invention are produced by polymerization of tetrahydrofuran (poly-THF). Statistical polymers and/or block copolymers of ethylene oxide and propylene oxide can be employed. Polyether polyols having 2, 3, or 4 OH groups are preferred. Polyether polyols are manufactured in a manner known to one skilled in the art and are commercially obtainable.

Polyoxyethylene or -propylene diols or triols are preferred. The molecular weight of these polyethers can be from approximately 200 to 3000 g/mol, in particular up to 1000 g/mol.

Polyols that contain tertiary amino groups are preferably not contained in the composition. They degrade the application properties. The functionality of the polyol mixture is to be greater than 2.3, in particular from 2.5 to 4. In an embodiment of the invention, the composition is characterized in that that polyester polyols and/or in particular polyether polyols having an average functionality greater than 2.5 are used as polyols. If the crosslinking density is not sufficient, the crosslinked matrix binding agent is not sufficiently mechanically stable.

Polyfunctional isocyanates are suitable as polyisocyanates in the isocyanate component. The isocyanates preferably contain on average 2 to 5, preferably up to 4 NCO groups. Examples of suitable isocyanates are aromatic isocyanates such as 1,5-naphthylene diisocyanate, 2,4- or 4,4'-diphenylmethane diisocyanate (MDI), xylylene diisocyanate (XDI), m- and p-tetramethylxylylene diisocyanate (TMXDI), isomers of toluylene diisocyanate (TDI), di- and tetraalkyldiphenylmethane diisocyanate, 3,3'-dimethyldiphenyl-4,4'-diisocyanate (TODI) 1,3-phenylene diisocyanate, 1,4-phenylene diisocyanate, 4,4'-dibenzyl diisocyanate; aliphatic isocyanates such as hydrogenated MDI (H12MDI), 1-methyl-2,4-diisocyanatocyclohexane, 1,12-diisocyanatododecane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dimer fatty acid diisocyanate, dicyclohexylmethane diisocyanate, cyclohexane-1,4-diisocyanate, ethylene diisocyanate, or phthalic acid bis-isocyanatoethyl ester.

Portions of low-molecular-weight prepolymers can also be employed, for example reaction products of MDI or TDI with low-molecular-weight diols, for example ethylene glycol, diethylene glycol, propylene glycol, dipropylene glycol, or triethylene glycol. These prepolymers can be produced by reacting an excess of monomeric polyisocyanate in the presence of diols. The molecular weight of the diols is generally below 1000 g/mol. Monomeric isocyanates can optionally be removed from the reaction product by distillation.

In an embodiment, aromatic diisocyanates are preferred according to the present invention; in another embodiment, mixtures of aliphatic and aromatic isocyanates are preferably employed. In particular, at least 50 mol % of the NCO groups are to be based on MDI and isomers thereof. In an embodiment, the two-component polyurethane composition is characterized in that at least 50 mol % NCO groups from MDI and isomers thereof are contained as isocyanate groups. Liquid isocyanates may be used provided they exhibit a phase incompatibility with the polyols. According to the present invention it is also possible, but not necessary, for the quantity of isocyanate groups to be reduced by reaction to carbodiimides and derivatives thereof, in particular to uretonimines. In an embodiment, the two-component polyurethane composition is characterized in that the composition contains carbodiimides and/or uretonimines from the aromatic isocyanates. The proportion of reacted NCO groups can be 3 to 25 mol % of the NCO groups originally present. The mixture of polyisocyanates is preferably to be flowable at room temperature (25° C.). In order to obtain stable compositions, this component is not to contain any constituents that produce reactions which bring about an increase in viscosity under storage conditions.

The two-component polyurethane compositions according to the present invention can furthermore contain adjuvants that preferably are mixed entirely or partly into the polyol component. These are to be understood as substances that as a rule are added in small quantities in order to modify the properties of the composition, for example viscosity, wetting behavior, stability, reaction rate, bubble formation, shelf life, or adhesion, and also to adapt utilization properties to the intended application. Examples of adjuvants are leveling agents, wetting agents, catalysts, aging protectants, dyes, drying agents, resins, and/or waxes.

For example, the composition according to the present invention can additionally contain stabilizers. "Stabilizers" are to be understood for purposes of this invention as antioxidants, UV stabilizers, or hydrolysis stabilizers. Examples thereof are the commercially available sterically hindered phenols and/or thioethers and/or substituted benzotriazoles and/or amines of the hindered amine light stabilizer (HALS) type.

Catalysts can also be employed. The usual organometallic compounds known in polyurethane chemistry are employed as catalysts, for example compounds of iron, titanium, zirconium, aluminum, lead, bismuth, or also in particular tin. It is preferably possible for these catalysts to contain, as a mixture or as a complex and at a molar ratio from 0.25:1 to 2:1, polyhydroxy compounds selected from α-hydroxyketones and/or triphenols having three adjacent OH groups. In particular, 5-, 6-, or 7-ring compounds can be employed as cyclic α-hydroxyketones, and 1-alkyl-substituted 2,3,4- or 3,4,5-OH derivatives can be used as triphenols. These are substances that act as complexing agents with the metal atoms mentioned above. These complexing agents are to have a molar mass below 500 g/mol, or can also be bound to a carrier. Those substances which optionally comprise a further OH group, COOH group, or ester group are particularly suitable as a complexing agent. In the crosslinking reaction, this complexing agent can also react with the reactive composition and can be permanently incorporated into the matrix.

Another group of catalysts is those based on tertiary amines. Linear or cyclic aliphatic amines are suitable, for example, such as methylcyclohexylamine, dimethylbenzylamine, tributylamine, monoethanolamine, triethanolamine, diethylenetriamine, triethylenetetramine, triethylenediamine, guanidine, morpholine, N-methylmorpholine, diazabicyclooctane (DABCO), 1,8-diazabicyclo-(5,4,0)-undecene-7 (DBU), or diazabicyclonones (DBN). The catalyst can be employed in a quantity from 0.01 to approximately 5 wt % based on the total weight of the composition.

An embodiment of the two-component polyurethane composition is characterized in that that tin compounds, in particular tin catalysts having polyhydroxy compounds as complexing agents or tertiary amines, selected from cyclic α-hydroxyketones or 1-alkyl-2,3,4-triphenols, are contained as a catalyst.

It is also possible for small quantities of plasticizers, color pastes, or a molecular sieve to be contained. Liquid compounds that capture moisture during storage can also be used as desiccants. The quantity of such constituents is to be less than 10 wt %, however (based on the two-component composition). Preferably no pigments, molecular sieves, fillers, and/or plasticizers are contained. The composition according to the present invention should preferably contain no organic solvents. "Solvents" are to be understood here as liquid substances having a boiling point below 200° C. Substantially nonvolatile compounds that are used in order to disperse or dissolve additives are not considered solvents in this regard.

In addition, resins can optionally be contained. These can be natural resins or synthetic resins. A particular embodiment employs OH-group-containing resins, in particular resins having multiple OH groups. These can react with the isocyanates. In a preferred embodiment the quantity can be up to 15 wt %.

The additives are added to the components in such a way that shelf stability results. In particular, no additives that promote the formation of gas bubbles, such as $CO_2$, in the adhesive are to be added, for example mono- or polyfunctional carboxylic acids.

A preferred embodiment of the composition contains 30 to 70 wt % polyols having a functionality above 2.5, in particular polyether polyols and/or polyester polyols, 70 to 30 wt % polyisocyanates, in particular having at least 50 mol % of all isocyanate groups from MDI and isomers thereof, 0.1 to 5 wt % additives selected from stabilizers and catalysts, wherein the sum of the constituents is to yield 100%. The mixture is in particular to be free of reactive amine-containing constituents, for example polyols.

A mixture according to the present invention must exhibit an incompatibility at mixing temperature after mixing.

"Incompatibility" is to be understood for purposes of the invention to mean that the components are miscible with one another but form two phases. This can be ascertained, in particular, visually. The individual components are transparent; after mixing and optionally degassing, a cloudy phase forms. In a simple test the two components, optionally without pigments, are mixed at 25° C. The samples then rest and are evaluated optically. If the solution of the components is cloudy for up to 2 minutes, a phase separation exists.

In order to enable a use according to the present invention a two-component polyurethane composition according to the present invention has a viscosity in mixed form from 20 to 3000 mPas (measured with Brookfield RTV, DIN ISO 2555) measured at a temperature between 20 and 60° C. In particular, the viscosity is to be from 100 to 1000 mPas, measured at 20 to 40° C. The two-component polyurethane composition can be applied at these temperatures. The viscosity is to be determined immediately after mixing, for example up to 2 minutes after mixing; it slowly increases as the crosslinking reaction begins to occur.

The two-component polyurethane composition according to the present invention has a good processing time. That time is to be more than 10 minutes. The "processing time" is to be understood as the time after which the viscosity of a mixture at 25° C. has risen to more than 300% of the original value, but at least to above 3000 mPas. The processing time can be influenced by the selection of the isocyanates and the catalysts.

The two-component polyurethane compositions form a two-phase system after mixing. This can be seen by way of the incompatibility. Multi-phase systems dispersed in one another form at approximately 25° C., as can be ascertained by the clouding of the mixture that is produced. The mixtures according to the present invention are to be used in the phase-separation state.

By way of the selection of the constituents, the composition according to the present invention is to have a glass transition temperature (Tg) of more than 60° C. (measured with DSC, DIN 11357), in another embodiment in particular from 100 to 130° C. The high Tg is necessary in order to obtain the required mechanical stability in the cured composite system as well. Excellent mechanical stability of the composition is obtained thanks to the selection according to the present invention of the polyol and the isocyanate component. The structural stability of the matrix material can be measured, for example, by way of the E-modulus. The composition according to the present invention ensures that the E-modulus is greater than 1000 MPa at temperatures between −10° C. and +70° C. (analogous to DIN EN ISO 527).

The two-component polyurethane compositions according to the present invention are suitable as a matrix resin for fiber-reinforced shaped parts (composites). These can be employed in a variety of application methods, for example in RTM methods or in the infusion method.

Also a subject of the invention is a method for manufacturing composite materials in which the two-component polyurethane compositions are employed. The compositions according to the present invention are applied by introduction into a mold.

Known high-strength fiber materials are suitable as constituents of composite materials. These can be made, for example, of glass fibers; synthetic fibers such as polyester fibers, polyethylene fibers, polypropylene fibers, polyamide fibers, polyimide fibers, or aramid fibers; carbon fibers; boron fibers; oxide-type or non-oxide-type ceramic fibers such as aluminum oxide/silicon dioxide fibers, silicon carbon fibers; metal fibers, for example made of steel or aluminum; or natural fibers such as flax, hemp, or jute. These fibers can be introduced in the form of mats, woven fabrics, knitted fabrics, plies, nonwoven fabrics, or rovings. Two or more of these fiber materials can also be used as a mixture. Chopped fibers can be selected, but it is preferred to use synthetic long fibers, in particular woven fabrics and plies. These high-strength fibers, plies, woven fabrics, and rovings are known to one skilled in the art.

The fibers are placed into the molds in a predefined orientation. The quantity of fiber materials can be very high; in particular, fiber proportions of above 60% (% by volume), based on the shaped element, are used. Further placed-in parts can optionally also be inserted. The pre-mixed composition according to the present invention is then introduced.

An embodiment of the method according to the present invention is a method for manufacturing fiber composite materials wherein an external mold having fiber materials is provided and a liquid two-component polyurethane composition is introduced into said mold under pressure, wherein said composition is introduced in the state of phase incompatibility, characterized in that the proportion of fiber materials is more than 60%.

In the methods according to the present invention, the two-component mixture is utilized directly after manufacture. These are substantially optically cloudy mixtures, which is regarded as an indication of the phase incompatibility. Because the mixed composition reacts, it is useful to mix only that quantity of the components which can be processed immediately thereafter. It is likewise possible to mix and fill the molds continuously. Because the incompatible phases are present in the form of a fine dispersion, the compositions can be processed without difficulty using the usual apparatus, such as pumps, nozzles, or hoses. Regardless of any theory, it can be assumed that the incompatibility brings about a decrease in the reaction rate.

The method according to the present invention comprises two embodiments. Inflowing can be carried out in a short time by injection under pressure (resin transfer molding (RTM) method), optionally also with vacuum assistance. Compositions that have a shorter processing time, but exhibit a fast reaction thereafter, are preferred here. In another embodiment the mold is filled by the application of vacuum (infusion method). A long open time is advantageous in this embodiment. The viscosity of the composition suitable according to the present invention must be low. It must rise only slightly even under the process conditions of filling the mold. According to the present invention the mixture of the composition immediately after mixing is to be between 20 and 3000 mPas (EN ISO 2555, Brookfield viscometer, 25° C.), preferably below 1000 mPas. Care must be taken here to select the flow rate so that air or gases between the fiber materials can escape.

A long processing time is particularly important in the embodiment for infusion methods. Compositions that contain no catalysts are therefore used in particular in this embodiment. Inflow onto the fiber materials, displacement of air bubbles, and filling of the mold can be carried out over a longer period of time. As a result of the slow execution or progress of the reaction, the fiber materials can become completely embedded in the matrix material.

In the embodiment as an RTM method, filling of the mold must occur in a short time. Here the cloudy reaction mixture is introduced under pressure into the mold. Rapid embedding of the fibers can be ensured by the low initial viscosity. In this embodiment the compositions preferably also contain catalysts. The latter quickly result in an acceleration of the reaction, so that rapid curing occurs. This can also be assisted by an elevated temperature. A short dwell time in the mold is then also possible.

Once the mold is filled, the composition begins to cure. This can occur without additional delivery of heat. The reaction heat resulting from the crosslinking reaction does not lead to local overheating of the substrates. In order to accelerate the crosslinking reaction it is possible to heat the filled mold. It can be heated to temperatures of up to 120° C.; faster crosslinking of the matrix material is thereby achieved. The mold can thus be removed more quickly from the shaped part, and is then available for further working steps.

A further subject of the invention is also a fiber composite part made of at least 60% fibers and up to 40% of the crosslinked two-component polyurethane composition according to the present invention. These shaped fiber parts exhibit a high level of mechanical stability after crosslinking. This is the case even at elevated ambient temperatures.

A further subject of the invention is a fiber composite material containing at least 60% synthetic fiber materials and up to 40% of a crosslinking two-component polyurethane composition.

The two-component polyurethane compositions according to the present invention that exhibit an incompatibility upon mixing are suitable in particular for embedding fiber materials, for example for the infusion method or the RTM method. Here the known fiber materials are arranged and embedded together into a polymer matrix. The composition exhibits good adhesion to the fiber substrates. A defect-free matrix can be produced thanks to the decreased viscosity; in particular, bubbles in the shaped part are avoided. A further advantage is that good embedding of the fibers is made possible by the delayed reactivity. Overheating of the composite parts is avoided, thereby also preventing damage to sensitive fiber materials. The phase separation of the mixture does not result in a degradation of the properties of the crosslinked polymers, but rather improves the application properties.

EXAMPLES

The examples below explain the invention.

Example 1

Component A

Polyether triol (amine-free, Mn approximately 350)

Component B

MDI isomer mixture

NCO:OH ratio 1.5:1

Method: The constituents are mixed in a vessel using a high-speed stirrer with moisture excluded; the mixture is then degassed under vacuum while stirring.

The constituents were distinctly cloudy 3 minutes, 5 minutes, and 7 minutes after mixing.

The constituents were mixed and the viscosity (25° C.) was determined.

| | | |
|---|---|---|
| Viscosity: | starting | 190 mPas |
| | 5 min | 270 mPas |
| | 10 min | 480 mPas |

A long open time existed.

Example 2

Components A and B were mixed, together with 0.2% DABCO, at an NCO:OH ratio of 1.15:1.

The mixture was still cloudy after 4 minutes and 7 minutes.

Test specimens (4 mm thick) were cast from the samples directly after manufacture, and crosslinked at 95° C. (45 min) and 130° C. (60 min).

The crosslinked samples exhibited an E-modulus of approximately 2700 MPa (25° C.).

The invention claimed is:

1. A two-component polyurethane composition consisting of:
 - 10 to 80 wt % of a polyol component consisting of one or more polyols, wherein each polyol in the polyol component has a number-average molecular weight from 200 g/mol to 3000 g/mol and an average functionality of 2.3 to 4;
 - 5 to 70 wt % of at least one aromatic polyisocyanate;
 - 0 to 15 wt % of at least one additive in the polyol component or the aromatic polyisocyanate selected from leveling agent, wetting agent, catalyst, aging protectant, dye, drying agent, wax, adhesion modifier, antioxidant, UV stabilizer, hydrolysis stabilizer, plasticizer, color paste, pigment, molecular sieve, filler, solvent and resin;
 - wherein the composition is free of polyfunctional carboxylic acids and the components by weight add up to 100 wt. % and the proportions by weight are based on the total weight of the curable composition, the composition has an NCO:OH ratio from 2:1 to 1:2, the composition has a viscosity from 20 to 3000 mPas (EN ISO 2555, Brookfield viscometer, 25° C.) and exhibits a phase incompatibility after mixing and cured reaction products of the composition have an E modulus of more than 1000 MPa to 2700 MPa.

2. The two-component polyurethane composition according to claim 1, wherein a mixture of the two components has a viscosity of less than 1000 mPas (25° C.).

3. The two-component polyurethane composition according to claim 1, wherein at least 50 mol % of isocyanate groups in the composition are derived from MDI and isomers thereof.

4. The two-component polyurethane composition according to claim 1, wherein polyester polyols and/or polyether polyols, having an average functionality of more than 2.5, are used as polyols.

5. A two-component polyurethane composition consisting of:
 - 10 to 80 wt % of a polyol component consisting of one or more polyols, wherein each polyol in the polyol component has a number-average molecular weight from 200 g/mol to 3000 g/mol and an average functionality of 2.3 to 4;
 - 5 to 70 wt % of at least one aromatic polyisocyanate;
 - 0 to 15 wt % of at least one additive in the polyol component or the aromatic polyisocyanate selected from leveling agent, wetting agent, catalyst, aging protectant, dye, drying agent, wax, adhesion modifier, antioxidant, UV stabilizer, hydrolysis stabilizer, plasticizer, color paste, pigment, molecular sieve, filler, solvent and resin;
 - wherein the components by weight add up to 100 wt % and the proportions by weight are based on the total weight of the curable composition, the composition has an NCO:OH ratio from 2:1 to 1:2, the composition has a viscosity from 20 to 3000 mPas (EN ISO 2555, Brookfield viscometer, 25° C.) and exhibits a phase incompatibility after mixing and cured reaction products of the composition have an E modulus of more than 1000 MPa to 2700 Mpa and wherein tertiary amines or Sn compounds, with polyhydroxy compounds as complexing agents, are used as a catalyst, wherein the complexing agents are selected from cyclic α-hydroxyketones or 1-alkyl-2,3,4-triphenols.

6. The two-component polyurethane composition according to claim 5, wherein Sn catalysts, with polyhydroxy compounds as complexing agents, are used as a catalyst, wherein the complexing agents are selected from cyclic α-hydroxyketones or 1-alkyl-2,3,4-triphenols.

7. The two-component polyurethane composition according to claim 1, wherein cured reaction products of the composition have a glass transition temperature Tg between 100° C. and 130° C.

8. A two-component polyurethane composition consisting of:

10 to 80 wt % of a polyol component consisting of one or more polyols, wherein each polyol in the polyol component has a number-average molecular weight from 200 g/mol to 3000 g/mol and an average functionality of 2.3 to 4;

5 to 70 wt % of at least one aromatic polyisocyanate;

0 to 15 wt % of at least one additive in the polyol component or the aromatic polyisocyanate selected from leveling agent, wetting agent, catalyst, aging protectant, dye, drying agent, wax, adhesion modifier, antioxidant, UV stabilizer, hydrolysis stabilizer, plasticizer, color paste, pigment, molecular sieve, filler, solvent and resin;

wherein the components by weight add up to 100 wt. % and the proportions by weight are based on the total weight of the curable composition, the composition has an NCO:OH ratio from 2:1 to 1:2, the composition has a viscosity from 20 to 3000 mPas (EN ISO 2555, Brookfield viscometer, 25° C.) and exhibits a phase incompatibility after mixing, and the quantity of isocyanate groups is reduced by reaction to carbodiimides and derivatives thereof or uretonimines and derivatives thereof.

9. The two-component polyurethane composition according to claim 8, wherein the quantity of isocyanate groups is reduced by reaction to uretonimines.

10. A method for manufacturing a fiber composite material, comprising:

providing an external mold having fiber materials;

providing a two-component polyurethane composition consisting of:

10 to 80 wt % of a polyol component consisting of one or more polyols, wherein each polyol in the polyol component has a number-average molecular weight from 200 g/mol to 3000 g/mol and an average functionality of 2.3 to 4;

5 to 70 wt % of at least one aromatic polyisocyanate;

0 to 15 wt % of at least one additive in the polyol component or the aromatic polyisocyanate selected from leveling agent, wetting agent, catalyst, aging protectant, dye, drying agent, wax, adhesion modifier, antioxidant, UV stabilizer, hydrolysis stabilizer, plasticizer, color paste, pigment, molecular sieve, filler, solvent and resin;

wherein the components by weight add up to 100 wt. % and the proportions by weight are based on the total weight of the curable composition, the composition has an NCO:OH ratio from 2:1 to 1:2, the composition has a viscosity from 20 to 3000 mPas (EN ISO 2555, Brookfield viscometer, 25° C.) and exhibits a phase incompatibility after mixing and cured reaction products of the composition have an E modulus of more than 1000 MPa to 2700 MPa; and introducing the liquid two-component polyurethane composition into said mold under pressure, wherein said composition is introduced in a state of phase incompatibility.

11. The method according to claim 10, wherein fiber proportions of more than 60% (% by volume), based on the manufactured material, are used.

12. The method according to claim 10, further comprising the step of curing the filled mold at a temperature of up to 120° C.

13. The method according to claim 10, further comprising the step of degassing the composition immediately after mixing the two components.

14. The two-component polyurethane composition according to claim 1, wherein the at least one polyol has an average functionality of 2.3 to 3.

15. The two-component polyurethane composition according to claim 1, wherein only polyether polyols are used in the polyol component.

16. The two-component polyurethane composition according to claim 1, wherein polyols in the polyol component are selected from polyester polyols; oleochemical polyols; polyether polyols and mixtures thereof.

17. The two-component polyurethane composition according to claim 1, wherein polyether polyols in the polyol component have a number average molecular weight of 200 to 3000 g/mol.

18. The two-component polyurethane composition according to claim 1 wherein all of the aromatic polyisocyanate is selected from the group consisting of 2,4' methylene diphenyl diisocyanate, 4,4' methylene diphenyl diisocyanate, an isomer of toluene diisocyanate, a prepolymer reaction product of methylene diphenyl diisocyanate and a diol, a prepolymer reaction product of an isomer of toluene diisocyanate and a diol, and combinations thereof.

* * * * *

UNITED STATES PATENT AND TRADEMARK OFFICE

CERTIFICATE OF CORRECTION

PATENT NO. : 10,131,738 B2
APPLICATION NO. : 14/467782
DATED : November 20, 2018
INVENTOR(S) : Andreas Ferencz et al.

It is certified that error appears in the above-identified patent and that said Letters Patent is hereby corrected as shown below:

In the Specification

Column 3, Line 20: Change "molecular weight MN" to -- molecular weight $M_N$ --.

Signed and Sealed this
Twenty-ninth Day of October, 2019

Andrei Iancu
*Director of the United States Patent and Trademark Office*